(12) United States Patent
Fidan

(10) Patent No.: US 8,894,790 B2
(45) Date of Patent: Nov. 25, 2014

(54) CORRUGATED METALLIC FOIL TAPE

(75) Inventor: Muzaffer Fidan, Hickory, NC (US)

(73) Assignee: Shurtape Technologies, LLC, Hickory, NC (US)

( * ) Notice: Subject to any disclaimer, the term of this patent is extended or adjusted under 35 U.S.C. 154(b) by 0 days.

(21) Appl. No.: 13/406,575

(22) Filed: Feb. 28, 2012

(65) Prior Publication Data

US 2012/0152442 A1   Jun. 21, 2012

Related U.S. Application Data

(62) Division of application No. 12/290,842, filed on Nov. 4, 2008.

(51) Int. Cl.
  *B32B 3/28* (2006.01)
  *C09J 7/02* (2006.01)

(52) U.S. Cl.
  CPC . *B23B 37/14* (2013.01); *B23B 3/28* (2013.01); *C09J 7/0292* (2013.01); *C09J 2421/00* (2013.01); *C09J 2431/00* (2013.01); *C09J 2433/00* (2013.01); *C09J 2475/00* (2013.01); *C09J 2483/00* (2013.01)
  USPC .......................................... 156/205; 156/289

(58) Field of Classification Search
  None
  See application file for complete search history.

(56) References Cited

U.S. PATENT DOCUMENTS

| | | | |
|---|---|---|---|
| 2,001,862 A | 5/1935 | Battey | 128/76 |
| 3,054,439 A * | 9/1962 | Hallam | 29/561 |
| 4,248,926 A | 2/1981 | Tajima et al. | |
| 4,319,473 A | 3/1982 | Franke et al. | 72/196 |
| 4,478,670 A * | 10/1984 | Heyse et al. | 156/380.1 |
| 4,620,729 A | 11/1986 | Kauffman | 285/158 |
| 4,906,108 A | 3/1990 | Herrington et al. | |
| 5,188,883 A * | 2/1993 | Rawlyk | 428/189 |
| 5,246,762 A | 9/1993 | Nakamura | 428/172 |
| 5,384,174 A | 1/1995 | Ward et al. | 428/40 |
| 5,393,106 A | 2/1995 | Schroeder | 285/158 |
| 5,564,756 A | 10/1996 | Hamilton | 285/222 |
| 6,244,633 B1 | 6/2001 | Warren | 285/424 |
| 6,280,856 B1 | 8/2001 | Andersen et al. | |
| 6,902,784 B2 | 6/2005 | Princell et al. | 428/40.1 |
| 6,953,512 B2 | 10/2005 | Cohen et al. | 156/248 |
| 7,329,448 B2 | 2/2008 | Cunningham | 428/40.1 |
| 7,351,472 B2 | 4/2008 | Ishikawa et al. | |
| 2002/0113485 A1 | 8/2002 | Ketter et al. | 301/37.108 |

(Continued)

FOREIGN PATENT DOCUMENTS

JP   2001-291436   10/2001

OTHER PUBLICATIONS

International Search Report PCT/US09/05618.

(Continued)

*Primary Examiner* — Barbara J Musser
(74) *Attorney, Agent, or Firm* — Nelson Mullins Riley & Scarborough LLP

(57) ABSTRACT

A metallic foil tape having a top surface and a bottom surface with an adhesive applied to at least one of the top surface or the bottom surface of the metallic foil tape and corrugations in the metallic foil tape providing for expansion of the corrugated metallic foil tape in a circular or semi-circular shape. The corrugated metallic foil tape is suitable to be applied to contoured or three-dimensional surfaces, and is particularly suitable for use in sealing or joining components of heat, ventilation, and air conditioning (HVAC) units.

19 Claims, 8 Drawing Sheets

(56) References Cited

U.S. PATENT DOCUMENTS

| | | | |
|---|---|---|---|
| 2003/0228436 A1 | 12/2003 | Ishimura | 428/42.3 |
| 2004/0164116 A1 | 8/2004 | Foubert et al. | |
| 2005/0017350 A1 | 1/2005 | Corti et al. | |
| 2006/0083898 A1 | 4/2006 | Deng et al. | |
| 2006/0147667 A1 | 7/2006 | Salmon | 428/42.3 |
| 2006/0150549 A1* | 7/2006 | Webb et al. | 52/270 |
| 2006/0240208 A1 | 10/2006 | Ishikawa et al. | 428/40.1 |
| 2006/0240252 A1 | 10/2006 | Takahashi et al. | 428/354 |
| 2007/0272341 A1 | 11/2007 | Khan et al. | 156/71 |
| 2008/0032082 A1 | 2/2008 | Scur et al. | 428/40.1 |
| 2008/0047661 A1 | 2/2008 | McTaggart | 156/247 |
| 2008/0102240 A1 | 5/2008 | Serra et al. | 428/41.8 |

OTHER PUBLICATIONS

IECC 2003 803.2.8 Duct and Plenum Insulation and Sealing, published by International Code Council., © 2003, Paul Rimelspach Energy Designed Homes (sm) a dba of Rimelspach Ent. Inc. 1690 E. Choctaw Dr., London, OH 43140, pp. 1-6.

ASTM Designation: E 2342-03, *Standard Test Method for Durability Testing of Duct Sealants*, © ASTM International, 100 Barr Harbor Drive, PO Box C700, West Conshohocken, PA 19428, pp. 1-5, Jul. 31, 2007.

ASTM Designation: D 3654-96, *Standard Test Method for Holding Power of Pressure-Sensitive Tapes*, ASTM International, 100 Barr Harbor Drive, PO Box C700, West Conshohocken, PA 19428, pp. 437-440; May 1996.

* cited by examiner

CORRUGATED METALLIC FOIL TAPE

CROSS-REFERENCE TO RELATED APPLICATIONS

This application is a divisional of and claims priority from U.S. patent application Ser. No. 12/290,842, filed on Nov. 4, 2008. The disclosures of which are incorporated herein by reference in their entireties.

FIELD OF THE INVENTION

The present invention relates to a corrugated metallic foil tape, more particularly to a corrugated metallic foil tape for use in heating, ventilation, and air conditioning units, or related applications.

BACKGROUND OF THE INVENTION

It is of growing global concern not only to conserve energy but also to mitigate loss of energy. One such example is with loss of energy in residential or commercial buildings.

There are many known approaches in use today to attempt to address this problem of mitigating energy loss. It is known to use sealants, duct mastic and caulking for sealing around the joints of a heating, ventilation and air conditioner (HVAC) unit. Common sealants include butyl, polyurethane and acrylic sealants. In the case of a sealant, the sealant is typically applied by painting the joint or crack around the heating, ventilation, and air conditioning unit, particularly around joints or seams at the plenum, trunk registers or other duct branches. The sealant is subsequently cured after being applied. Among the disadvantages with such sealants and mastics, for example, are that they are often cumbersome and messy to apply and, once applied, are typically not readily removable or adjustable.

There are also known disadvantages associated with duct tape. It is often advised not to use duct tape in HVAC applications. According to the International Energy Conservation Code published by the International Code Council in IECC 2003 803.2.8 for Duct and Plenum Insulation and Sealing: "All joints, longitudinal and transverse seams, and connections in ductwork, shall be securely fastened and sealed with welds, gaskets, mastics (adhesives), mastic-plus-embedded fabric systems, or tapes. Tapes and mastics used to seal ductwork shall be listed and labeled in accordance with UL 181A or UL 181B. Duct connections to flanges of air distribution equipment shall be sealed and mechanically fastened . . . duct tape is not permitted as a sealant on any metal ducts." For example, over time conventional duct tape cracks and results in leaks in the system. This creates problems as the joints or seams in a HVAC unit are often inaccessible after installation.

There are also known disadvantages associated with flat HVAC rated aluminum tapes. Such flat aluminum tapes when applied around a circular vent or air duct, for example, leave gaps through which energy can escape. These tapes are often time consuming to apply to minimize gaps around contoured surfaces. Furthermore, they are not easily pliable around such surfaces and readily tear.

Since most duct leakage occurs at the connection to registers, plenums or branches in the duct system, at each of these connections a method of sealing the duct system is required. Field examination of duct systems have typically shown that these seals tend to fail over extended periods of time. ASTM Test Method E 2342-03, which is the standard test method for "Durability Testing of Duct Sealants," evaluates the durability of duct sealants by blowing heated air into test sections, combined with a pressure difference between the test sections and their surroundings. In the Method E 2342-03, the temperatures and pressures were chosen to expose the test sections to typical conditions that are found in residential duct systems. The duct leakage site geometry represents a leakage site commonly found in duct systems. Therefore, there is a need for a more efficient and reliable method to seal joints, and hence mitigate energy loss, in a HVAC unit, particularly in the plenum, trunk registers or other duct branches of a HVAC unit.

SUMMARY OF THE INVENTION

The present invention relates to a metallic foil tape having a top surface and a bottom surface with an adhesive applied to at least one of the top surface or the bottom surface of the metallic foil tape and corrugations in the metallic foil tape providing for expansion of the corrugated metallic foil tape in a circular or semi-circular shape. The corrugated metallic foil tape is suitable to be applied to contoured or three-dimensional surfaces, and is particularly suitable for use in sealing or joining components of heat, ventilation, and air conditioning (HVAC) units.

The present invention also relates to a method of making the corrugated metallic foil tape and a method of using the same.

The corrugated metallic foil tape of the present invention solves the problems associated with energy loss in HVAC units and provides an efficient, clean, and resilient alternative to known tapes and sealants used in such applications.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

The following detailed description of the embodiment(s) is merely exemplary in nature and is in no way intended to limit the invention, its application, or uses.

The tape of the present invention is a corrugated metallic tape for sealing joint or seams in a heating, ventilation and air conditioner (HVAC) unit. The joint or seam is typically associated with the plenum, trunk register or other duct branches in the HVAC unit. The tape of the present invention is particularly suited for sealing the HVAC collar to the plenum or to other parts of the HVAC unit where there are contoured, angled, or three-dimensional surfaces to which the tape needs to be applied. A plenum typically refers to a sealed chamber at the inlet or outlet of an air unit to which ductwork is attached.

Figure 1:
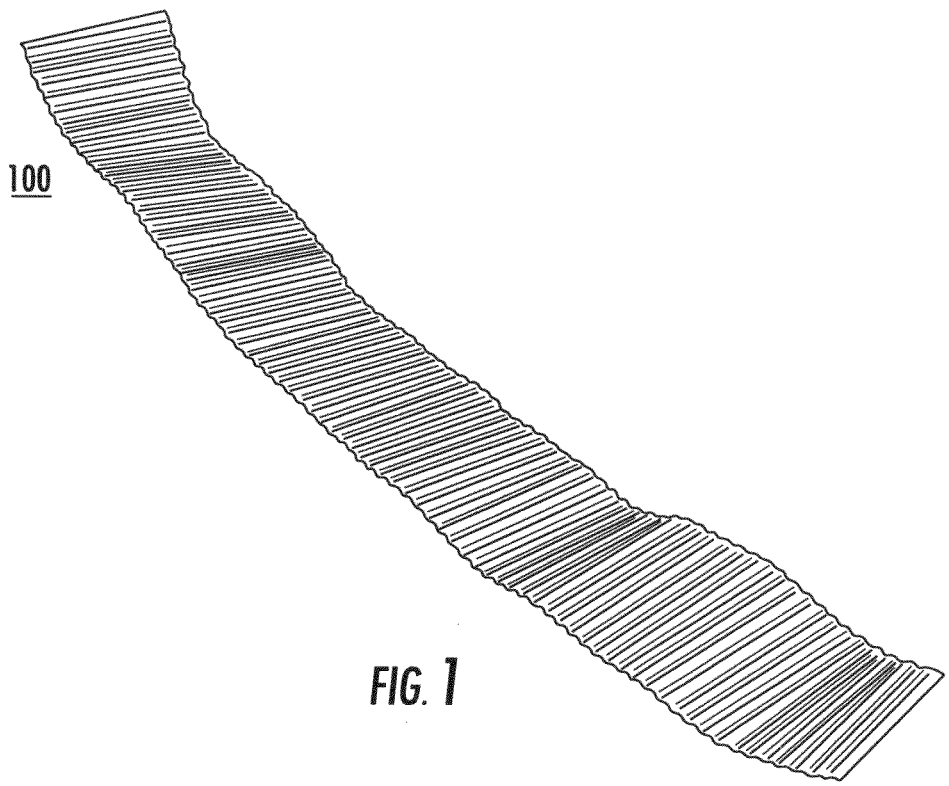
FIG. 1 is an illustrative drawing of a corrugated metallic foil adhesive tape in accordance with the present invention.
Figure 2A:
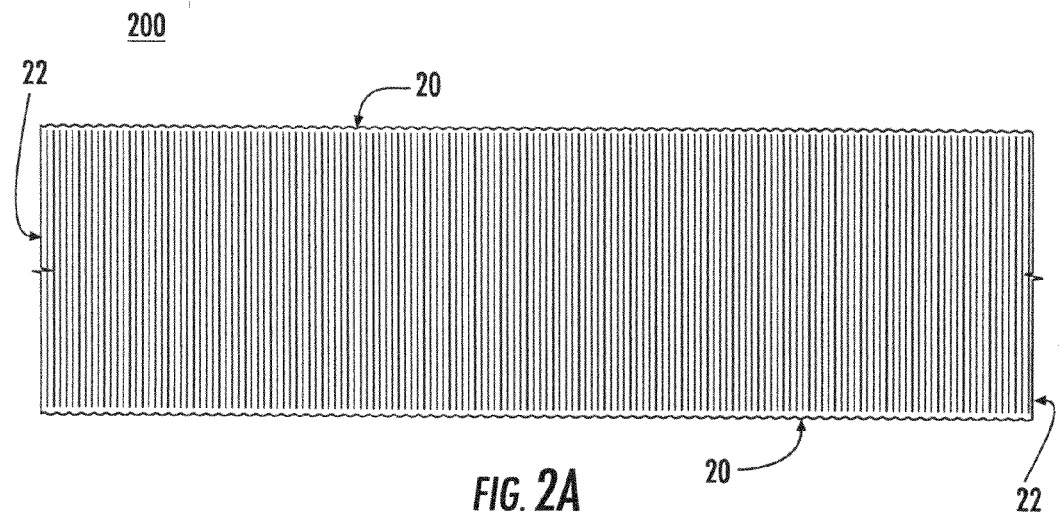
FIG. 2A illustrates corrugations in a corrugated metallic foil adhesive tape in accordance with the present invention.
Figure 2B:
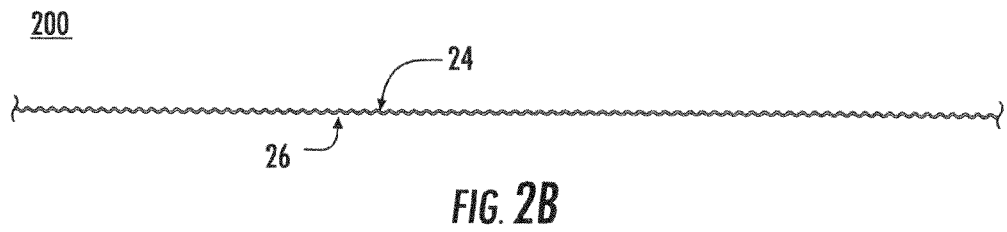
FIG. 2B illustrates the profile of the corrugated metallic foil adhesive tape of FIG. 2A.
Figure 3:
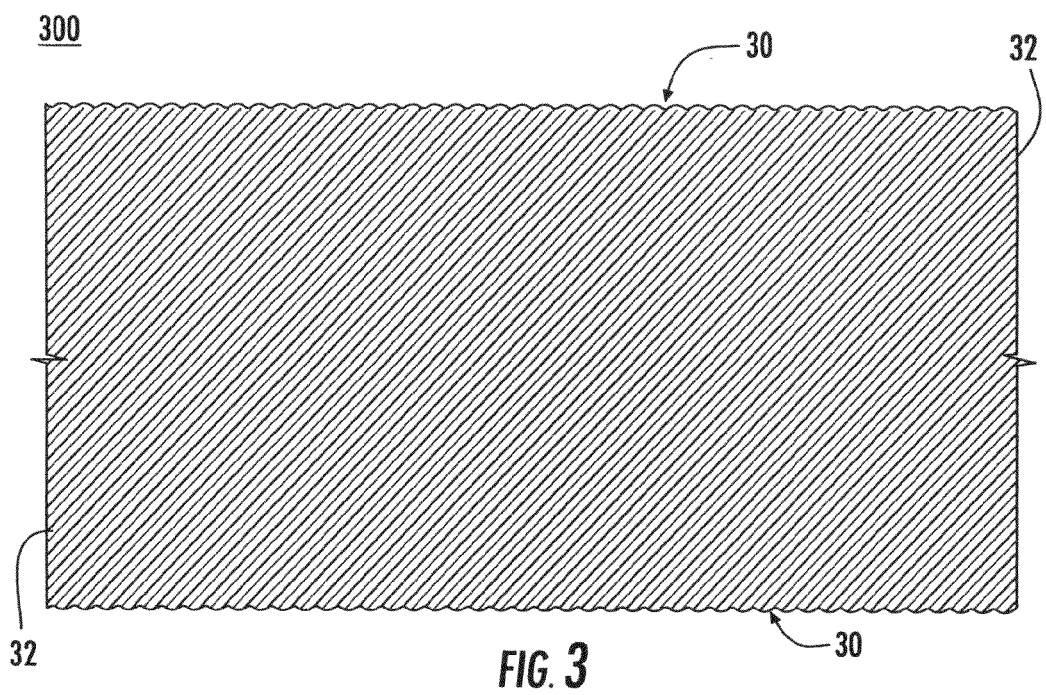
FIG. 3 illustrates corrugations at other than a ninety degree angle in a corrugated metallic foil adhesive tape in accordance with the present invention.

The metallic foil tape of the present invention is corrugated to have corrugations. The terms "corrugated" and "corrugations," as used herein, refer to regular indentations or markings including, but not limited to, folds, grooves, ridges, or furrows. Referring now to the figures, FIG. 1 illustrates a corrugated metallic foil tape 100 in accordance with the present invention. As illustrated in FIG. 2A, it is preferred that the corrugations are parallel to one another. FIG. 2B illustrates the profile of the corrugated metallic tape of FIG. 2A. The corrugations may be at a 90 degree angle as measured from the lengthwise edge(s) 20 of the corrugated metallic foil tape 200 as shown in FIG. 2A. Alternatively, the corrugations may be at an angle other than a 90 degree angle as measured from the lengthwise edge(s) 30 of the corrugated metallic foil tape 300 as shown in FIG. 3. FIG. 2A also illustrates the widthwise edge(s) 22 of the corrugated metallic foil tape 200 and FIG. 3 also illustrates the widthwise edge(s) 32 of the corrugated metallic foil tape 300.

Figure 4A:
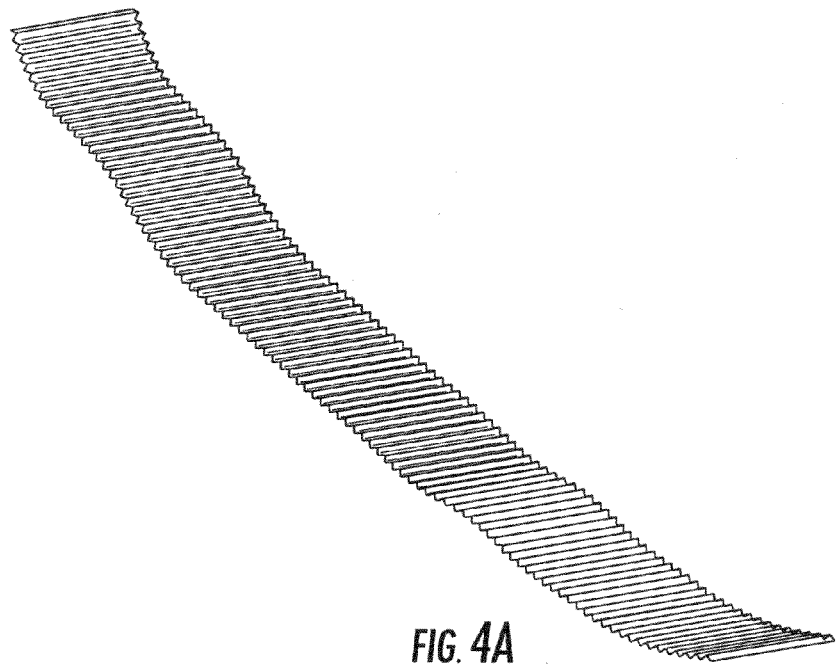
FIG. 4A is an illustrative drawing of another corrugated metallic foil adhesive tape in accordance with the present invention.
Figure 4B:
FIG. 4B illustrates the profile of the corrugated metallic foil adhesive tape of FIG. 4A.

As illustrated in FIGS. 2B and 4B, the corrugations in the tape may be of different shapes, sizes, and pitches. An advantage of the corrugated metallic foil tape of the present invention is that due to being corrugated, the tape is easier to stretch and conform without tearing, hence making the tape more durable, which is an improvement over the conventional flat metallic tapes that are being used in the industry. Commercially available flat metallic foil tapes may be obtained and subsequently corrugated in accordance with the method of the present invention. Examples of flat metallic foil tapes that are suitable for use in accordance with the present invention include, but are not limited to, Ideal IS 2000, Ideal 587A, Ideal 490, Nashua 324, Polyken 339, Fasson 0810, Fasson 0800, Venture 1581A, Compac 340, 3M-Scotch 3326, Shurtape AF 100, Venture 1581A, Ideal Seal 2000, Ideal Seal-587A/B, Fasson 0810, Covalence, Nashua 324A.

The metallic foil tape typically has a thickness in the range of from about ½ mil to about 5 mil, preferably about 2 mil in thickness. An example of a metallic foil tape suitable for use in the present invention is an aluminum foil tape.

Prior to being corrugated, a flat metallic foil tape may be directly coated with an adhesive then laminated to a release liner or indirectly coated with an adhesive by laminating the foil to a release liner with adhesive on it. The adhesive is generally applied to the flat metallic foil tape before corrugation. As discussed above herein, the corrugated metallic foil tape comprises a top surface and a bottom surface. Either the top surface or the bottom surface of the corrugated metallic foil tape comprises an adhesive coating.

Preferably, the adhesive is a high shear adhesive or an adhesive having holding power. For example, an adhesive that has good holding power would have the ability to withstand greater shear stress (i.e. forces applied parallel or tangential to a face of a material). ASTM D 3654 is a standard test method for Holding Power of Pressure Sensitive Tapes. A high shear adhesive is preferred over a low shear adhesive in HVAC unit applications because a high shear adhesive works at low temperature and high temperature conditions. Typically, a tape with a low shear adhesive has a tendency to tear or split under such conditions.

Preferably, the high shear adhesive is a pressure sensitive adhesive (PSA). The term "pressure sensitive adhesive," as used herein refers to, a material which in dry form is generally aggressively and permanently tacky at room temperature and firmly adheres to a variety of dissimilar surfaces upon mere contact without the need of more than typically finger or hand pressure. A pressure sensitive adhesive typically does not require activation by solvents or heat and adheres firmly to a wide variety of surfaces.

The pressure sensitive adhesive may be solvent based, water based, or in 100% solid form. Suitable types of pressure sensitive adhesives include, but are not limited to, acrylic, butyl rubber, natural rubber, polyurethane, styrene-butadiene rubber (SBR), synthetic isoprene rubber, ethylene vinyl acetate copolymers, and silicones.

The adhesive is applied to form a coating having a thickness of about 0.1 mil to about 5 mil, preferably about 1.5 to 2.5 mils. The adhesive coating is applied by any means known to one of ordinary skill in the art including, but not limited to, reverse roll, knife over roll, and extrusion coating onto a release liner which can be based on paper, clay, coated paper, glassine, film or any other material known in the art, then laminated to foil.

Referring to the figures, FIGS. 2B and 4B illustrate a corrugated metallic foil tape in accordance with the present invention having different cross-sectional views. FIG. 2B, for example, illustrates that the corrugated metallic foil tape has a top surface 24 and a bottom surface 26. As shown in FIG. 2A, the corrugated metallic foil tape 200 also has opposing edges both lengthwise 20 and widthwise 22. Each of these figures illustrate the corrugations in the tape may be of different shapes, sizes, and pitches.

The present invention also provides a method of making a corrugated metallic foil tape. The method comprises obtaining a flat metallic foil tape, and corrugating the flat metallic foil tape. The metallic tape is corrugated either manually or automatically to make regular indentations or markings in the tape. For example, one such method of corrugating the tape is a press with roller bars through which the uncorrugated tape is run, wherein the roller bars have demarcations or raised portions on the surfaces of the roller bars such that when the tape is fed between the roller bars, corrugations are made in the metallic tape. Manual or automated means can be used to run the tape through the rollers. Alternatively, presses or other mechanical devices or equipment may be used to apply pressure to the tape as it is corrugated.

Figure 5:
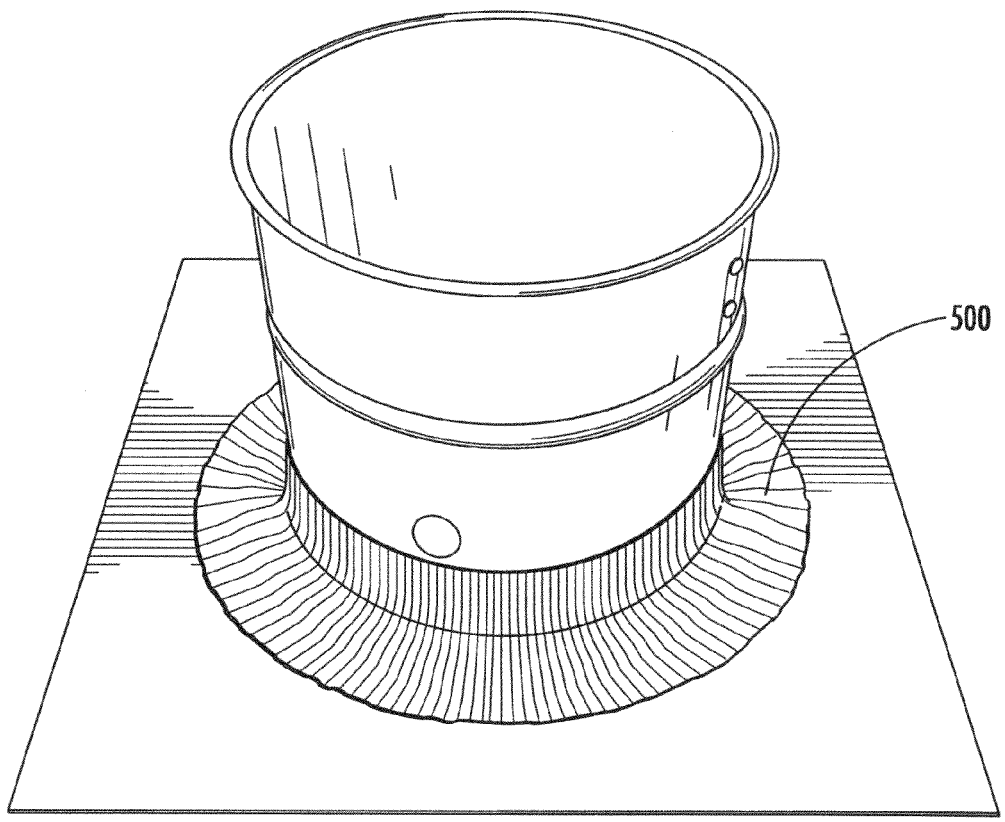
FIG. 5 is an illustration of a single continuous piece of corrugated metallic foil tape in accordance with the present invention applied in a circular or semi-circular shape to the vent of an air duct.

As discussed previously herein, there has been a growing need to solve the problems associated with energy loss, particularly in HVAC units. Among the numerous advantages associated with the corrugated metallic foil tape of the present invention is that it is able to conform to and against curved and three-dimensional surfaces without tearing and without destroying the integrity of the tape. FIG. 5 illustrates the corrugated metallic foil tape 500 of the present invention applied in a circular or semi-circular shape to an HVAC unit. The corrugated metallic foil tape of the present invention offers improved performance over conventional foil tapes as shown below in the examples where, particularly in these HVAC applications, a more durable, easily removable, and more efficient alternative is desired.

In the present invention, the tape is particularly suitable to be applied in a circular shape or into semi-circular segments or shapes. By having been corrugated, the metallic foil tape is easier to stretch and conform to a contoured, angled, or three-dimensional surface. By being corrugated, the metallic foil tape can be extended outward to form a smaller inside diameter and a larger outside diameter. There can be different angles and different shapes to the corrugations. The pitch can also be adjusted.

For example, as shown in FIG. 5, the corrugated metallic foil tape 500 of the present invention mates with the exterior dimensions of the collar flange of the plenum. The corrugated metallic foil tape 500 expands and stretches such that it conforms and is flush to the contoured, angled, or three-dimensional surface of the HVAC unit.

EXAMPLE

Metal Tapes

Figure 6:
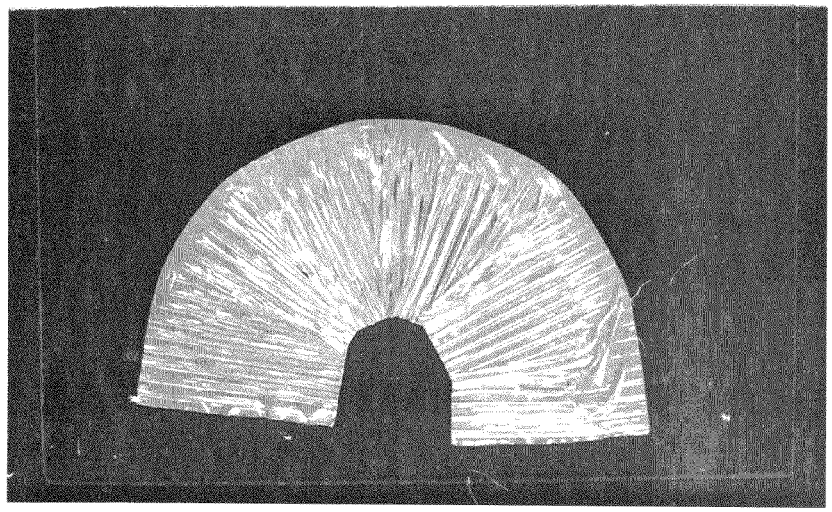
FIG. 6 is a photograph of a corrugated metallic foil tape in accordance with the present invention configured in a form of a semi-circle.

FIG. 6 is a photograph of a corrugated metallic foil tape in accordance with the present invention configured in a form of a semi-circular segment or shape.

Figure 7:
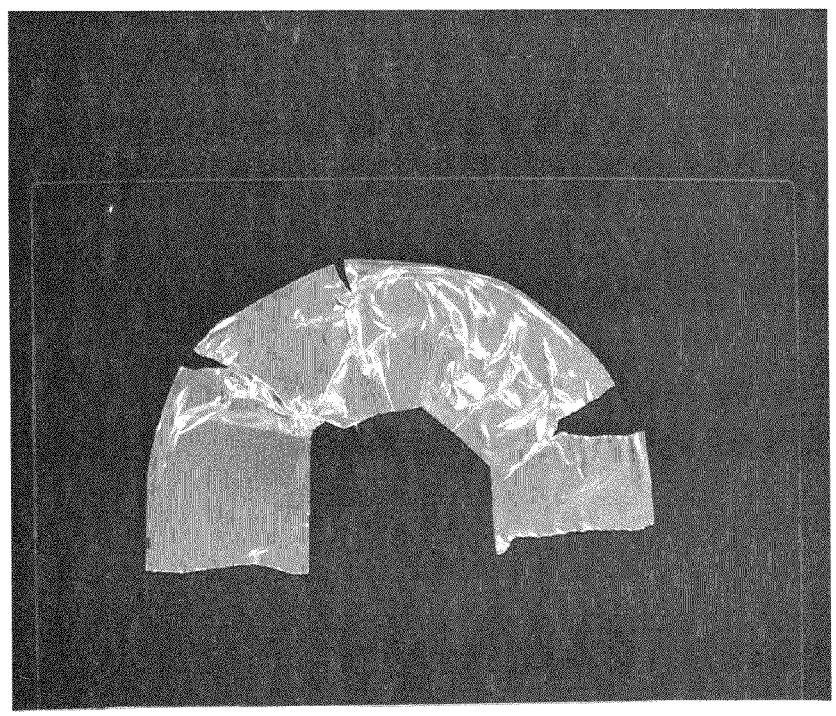
FIG. 7 is a photograph of a conventional foil tape configured in a form of an arc of a circle.

For comparative purposes, FIG. 7 is a photograph of a conventional foil tape configured in a form of an arc of a circle. It can be seen from FIG. 7 that the foil tape tears when trying to conform it in the shape of a circle.

Figure 8:
FIG. 8 is a photograph of a single continuous piece of corrugated metallic foil tape in accordance with the present invention applied in a circular or semi-circular shape to the vent of an air duct.

FIG. 8 is a photograph of a single continuous piece of corrugated metallic foil tape in accordance with the present invention applied around the circular vent of an air duct. The corrugated foil tape shown in FIG. 8 was applied in one continuous piece and had an installation time of two minutes and nine seconds.

Figure 9:
FIG. 9 is a photograph of pieces of conventional foil tape applied in a circular or semi-circular shape around the vent of an air duct.

For comparative purposes, FIG. 9 is a photograph of pieces of conventional foil tape applied around the circular vent of an air duct. The installation time for the standard foil tape shown in FIG. 9 required five pieces of tape, Shurtape AF 100, and had an installation time of three minutes and 54 seconds.

EXAMPLE

Duct Tape

An experiment was conducted for the following tapes in accordance with ASTM E2342 and the results of the experiment are set forth in Table 1.

TABLE 1

| Tape (Tested to the requirements of ASTM E2342) | Time to Failure in Days (Minimum 60 days required by the test) |
|---|---|
| Duct Tape [Covalence Nashua 557, Covalence Nashua 558 CA, Shurtape PC 857, and Shurtape PC 858 CA] | 1-13 |
| Duct tape backing with acrylic adhesive | 1-35 |
| Corrugated foil tape with acrylic adhesive in accordance with the present invention (using Shurtape AF 100 aluminum foil tape prior to corrugation) | 69+ |

It will therefore be readily understood by those persons skilled in the art that the present invention is suitable for broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A method of making a metallic foil tape, the method comprising:
    obtaining a flat metallic aluminum foil tape having a top surface and a bottom surface,
    obtaining a release liner having a pressure sensitive adhesive applied directly thereon,
    applying the release liner to the flat metallic aluminum foil tape wherein the pressure sensitive adhesive is between the flat metallic aluminum foil tape and the release liner,
    feeding the flat metallic aluminum foil tape with the release liner to a corrugator, and
    corrugating the flat metallic aluminum foil tape with the release liner to form corrugations in the flat metallic aluminum foil tape and the release liner.

2. The method according to claim 1, wherein the corrugations in the corrugated metallic foil tape provide for expansion of the corrugated metallic foil tape in a circular or semi-circular shape.

3. The method according to claim 1, wherein the pressure sensitive adhesive is selected from the group consisting of acrylic, synthetic rubber, natural rubber, polyurethane, styrene-butadiene rubber (SBR), synthetic isoprene rubber, ethylene vinyl acetate copolymers, and silicone.

4. The method according to claim 1, wherein the corrugations are parallel to one another.

5. A method of making a metallic foil tape having a top surface and a bottom surface, the method comprising:
    obtaining a flat metallic foil tape,
    obtaining a release liner having a pressure sensitive adhesive applied directly thereon,
    applying the release liner to the flat metallic foil tape wherein the pressure sensitive adhesive is between the flat metallic foil tape and the release liner,
    feeding the flat metallic foil tape with the release liner to a corrugator, and
    corrugating the flat metallic foil tape with the release liner to form corrugations in the flat metallic foil tape and the release liner, wherein the corrugations are parallel to one another.

6. The method according to claim 5, wherein the corrugations in the corrugated metallic foil tape provide for expansion of the corrugated metallic foil tape in a circular or semi-circular shape.

7. The method according to claim 5, wherein the pressure sensitive adhesive is selected from the group consisting of acrylic, synthetic rubber, natural rubber, polyurethane, styrene-butadiene rubber (SBR), synthetic isoprene rubber, ethylene vinyl acetate copolymers, and silicone.

8. The method according to claim 5, wherein the flat metallic foil tape is an aluminum foil tape.

9. A method of making a metallic foil tape, the method comprising:
obtaining a flat metallic aluminum foil tape having a top surface and a bottom surface,
applying a pressure sensitive adhesive to at least one of the top surface or the bottom surface of the flat metallic aluminum foil tape using a release liner having the pressure sensitive adhesive applied directly thereon, and
corrugating the flat metallic aluminum foil tape with the release liner to form corrugations in the flat metallic aluminum foil tape and the release liner.

10. The method according to claim 9, wherein the corrugations in the corrugated metallic foil tape provide for expansion of the corrugated metallic foil tape in a circular or semicircular shape.

11. The method according to claim 9, wherein the pressure sensitive adhesive is selected from the group consisting of acrylic, synthetic rubber, natural rubber, polyurethane, styrene-butadiene rubber (SBR), synthetic isoprene rubber, ethylene vinyl acetate copolymers, and silicone.

12. The method according to claim 9, wherein the corrugations are parallel to one another.

13. The method according to claim 9, wherein the release liner is applied to the flat metallic aluminum foil tape by lamination prior to corrugation.

14. A method of making a metallic foil tape, the method comprising:
obtaining a flat metallic aluminum foil tape having a top surface and a bottom surface,
laminating a release liner having a pressure sensitive adhesive applied directly thereon to at least one of the top surface or the bottom surface of the flat metallic aluminum foil tape, and
corrugating the flat metallic aluminum foil tape with the release liner to form corrugations in the flat metallic aluminum foil tape with the release liner.

15. The method according to claim 14, wherein the corrugations in the corrugated metallic foil tape provide for expansion of the corrugated metallic foil tape in a circular or semicircular shape.

16. The method according to claim 14, wherein the pressure sensitive adhesive is selected from the group consisting of acrylic, synthetic rubber, natural rubber, polyurethane, styrene-butadiene rubber (SBR), synthetic isoprene rubber, ethylene vinyl acetate copolymers, and silicone.

17. The method according to claim 14, wherein the corrugations are parallel to one another.

18. A method of making a metallic foil tape, the method comprising:
obtaining a flat metallic foil tape having a top surface and a bottom surface,
applying a pressure sensitive adhesive to at least one of the top surface or the bottom surface of the flat metallic foil tape using a release liner having the pressure sensitive adhesive applied directly thereon, and
corrugating the flat metallic foil tape with the release liner to form corrugations in the flat metallic aluminum foil tape and the release liner.

19. A method of making a metallic foil tape, the method comprising:
obtaining a flat metallic foil tape having a top surface and a bottom surface,
laminating a release liner having a pressure sensitive adhesive applied directly thereon to at least one of the top surface or the bottom surface of the flat metallic foil tape, and
corrugating the flat metallic foil tape with the release liner to form corrugations in the flat metallic foil tape and the release liner.

* * * * *